March 17, 1931. H. A. BALLARD ET AL 1,796,277

CHEEKING MACHINE

Filed Jan. 3, 1928 5 Sheets-Sheet 1

INVENTORS
Harrie A. Ballard
Olof T. Hedlock
By their Attorney
Nelson W. Howard.

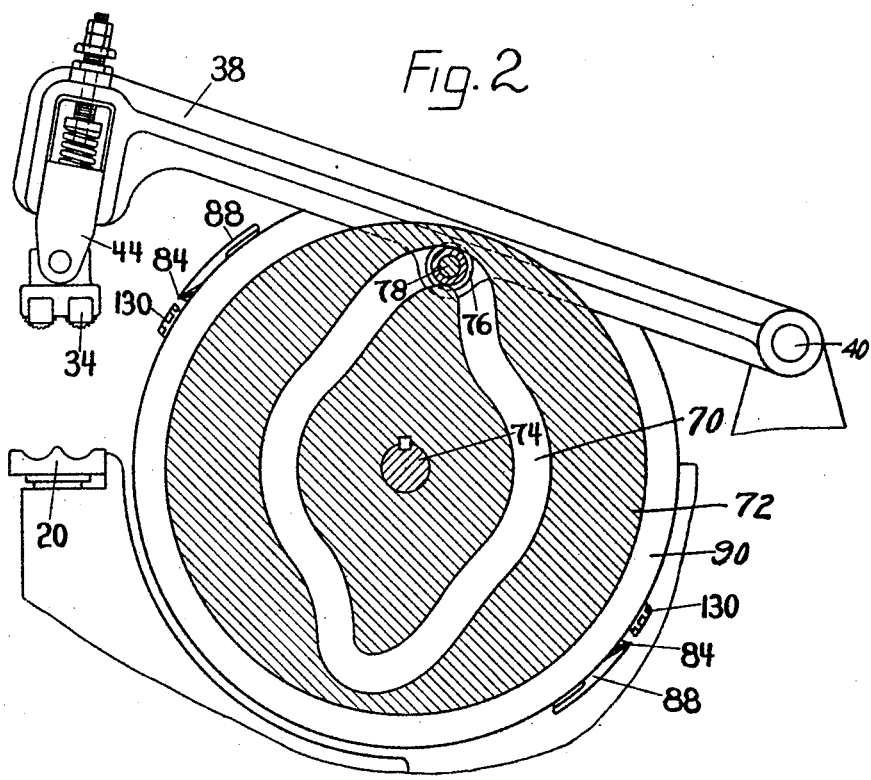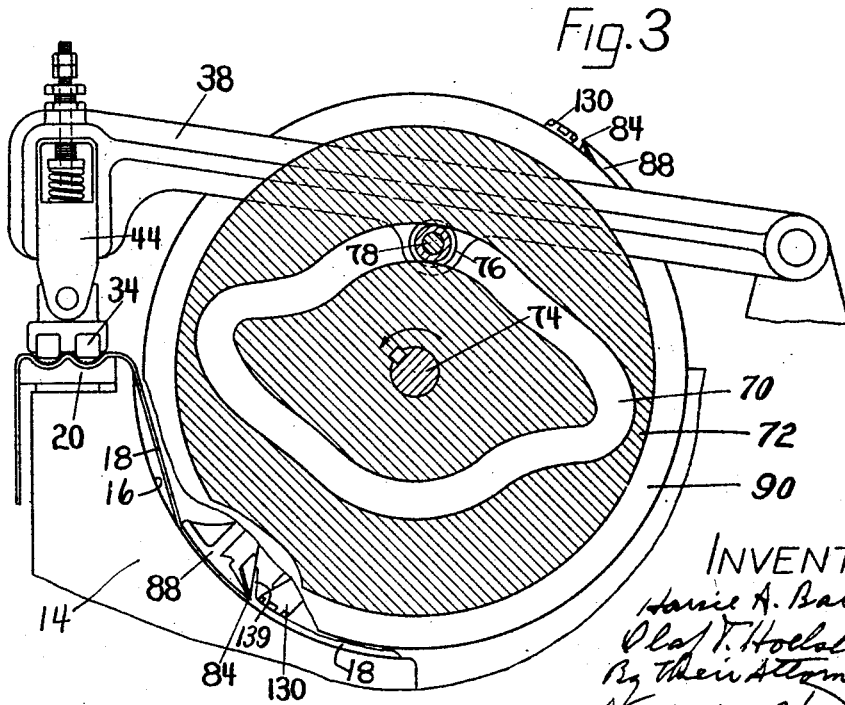

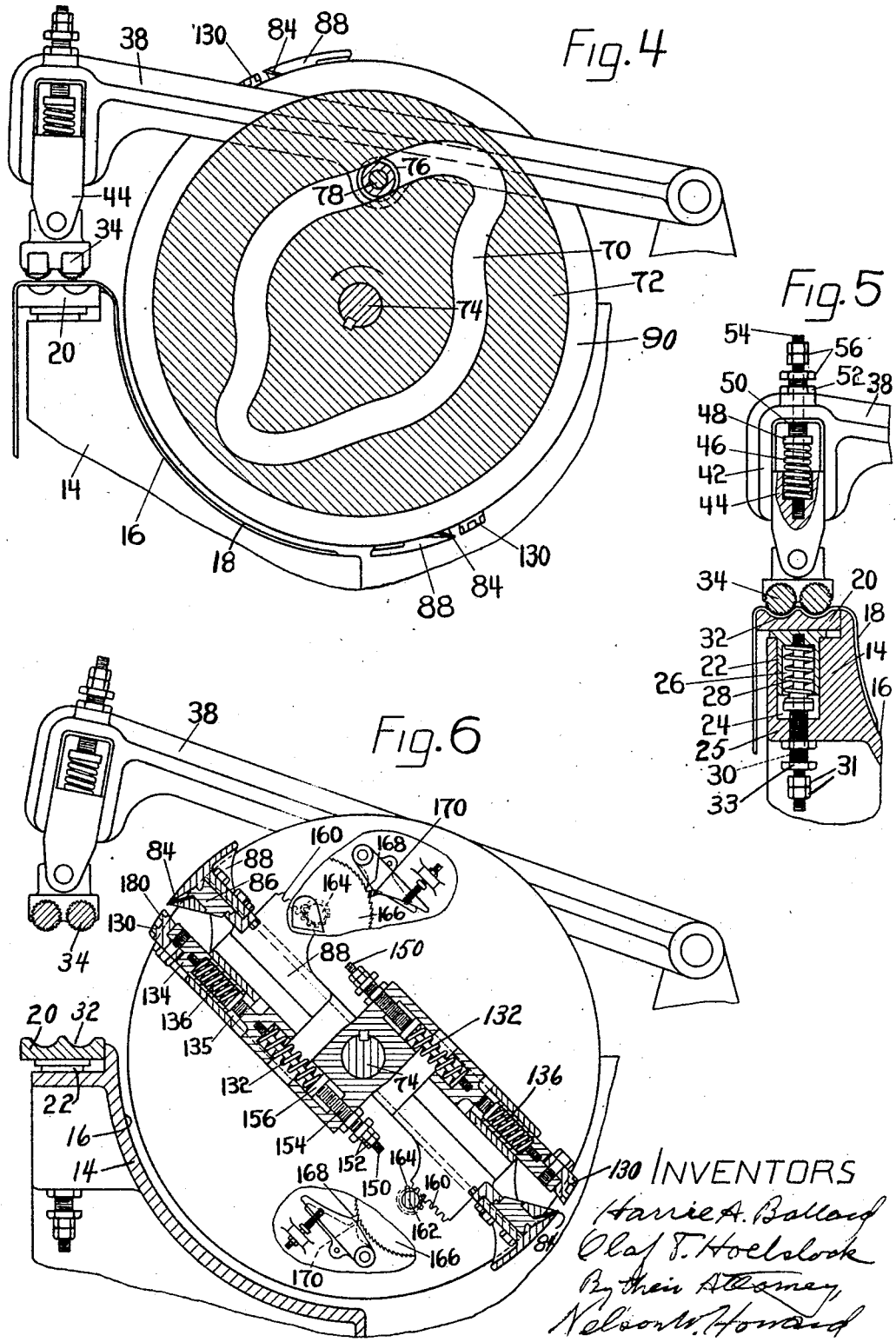

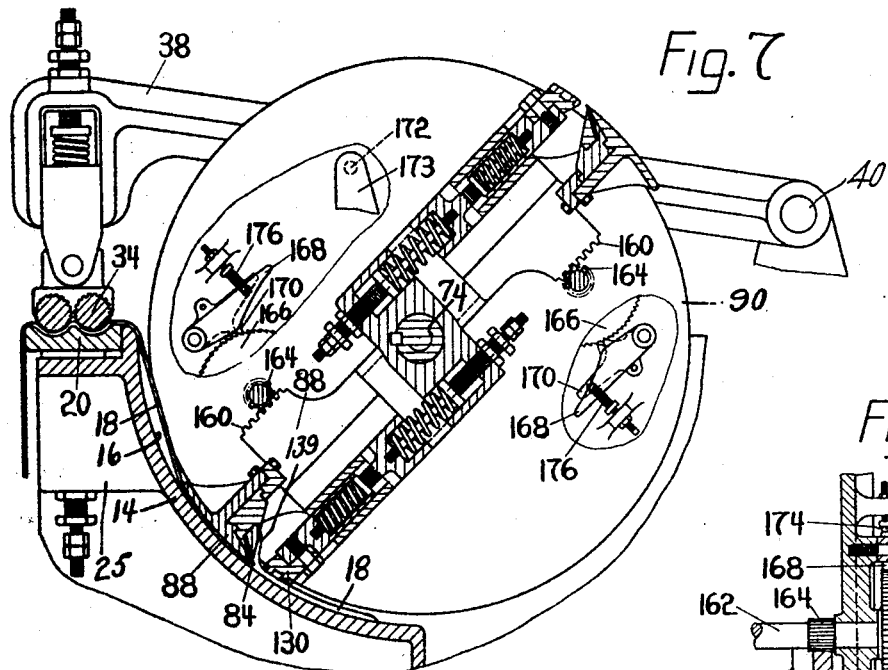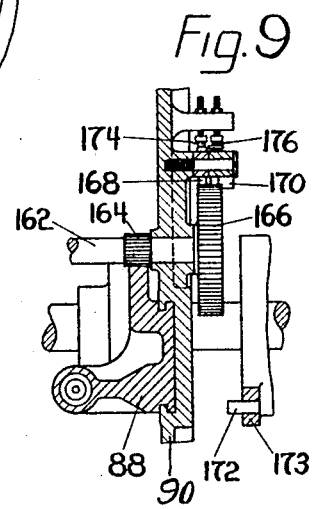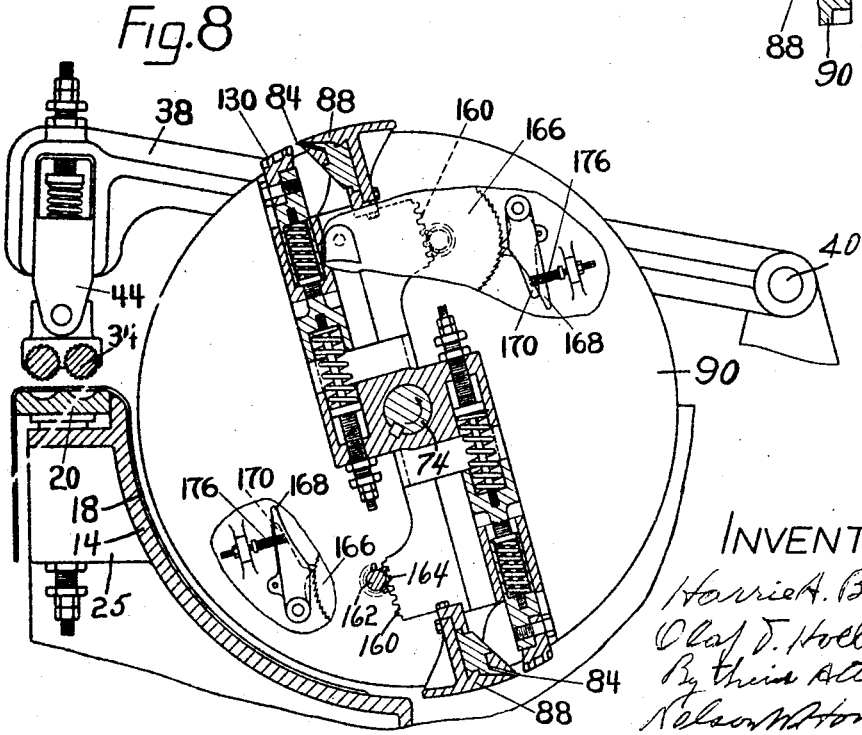

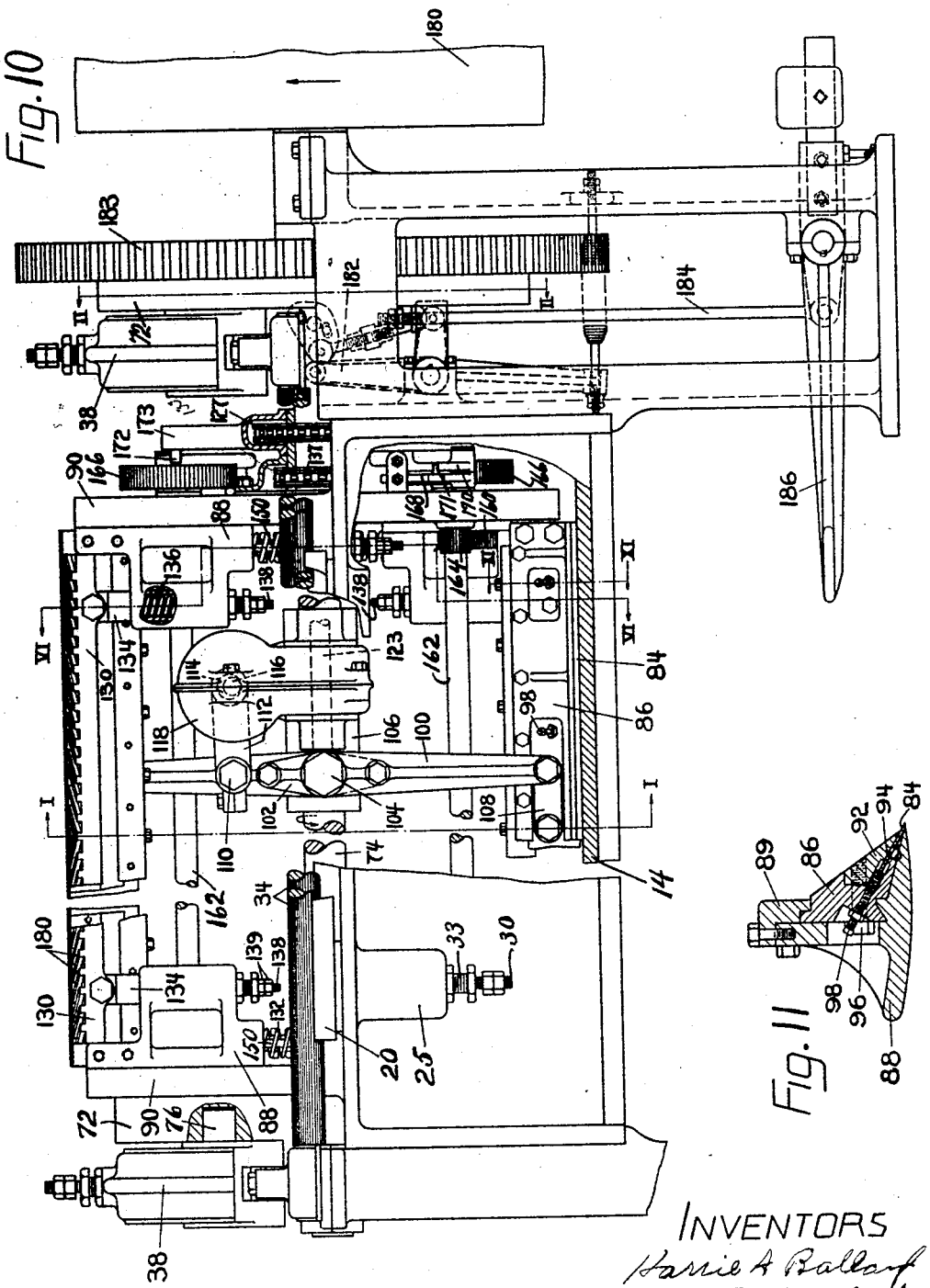

Patented Mar. 17, 1931

1,796,277

UNITED STATES PATENT OFFICE

HARRIE A. BALLARD, OF BEVERLY, AND OLAF T. HOELSLOCK, OF LYNN, MASSACHUSETTS, ASSIGNORS TO THE TURNER TANNING MACHINERY COMPANY, OF PORTLAND, MAINE, A CORPORATION OF MAINE

CHEEKING MACHINE

Application filed January 3, 1928. Serial No. 244,231.

This invention relates to cutting machines and is illustrated as embodied in a machine for splitting off from the thick parts of the heads and necks of hides and skins portions representing a thickness in excess of the thickness of the body parts of the same hides and skins. It is to be understood, however, that the invention and various important features thereof may have other applications and uses.

Machines for reducing the thicker head and neck portions of hides and skins to the thickness of the body portions thereof are commonly referred to as cheeking machines. As heretofore constructed these machines were provided with a knife or other cutter which had to be adjusted by the operator to suit the requirements of the work. In order to insure that the reduced portion of a hide or skin, secured by splitting off the excess thickness, would correspond in thickness to the remainder of the hide or skin, it was necessary for the operator to make the required adjustment of the cutter with considerable care. Furthermore, because of the time factor the operator was frequently induced to omit adjustments of the cutter except the relatively coarse adjustments for given batches of sorted work, no adjustment being made for each individual piece of work unless special circumstances should demand it.

It is an object of this invention to provide a cutting machine of the type referred to in which the cutter will be quickly adjusted for each and every piece of work thus making it possible to secure uniformly satisfactory results. It is a further object of the invention to provide a machine which will require less effort and less skill on the part of the operator while at the same time making possible a substantial increase in production.

To these ends and in accordance with important features of the invention there is provided, in the illustrated machine, means for gaging the thickness of the body portion of a hide or skin and automatically adjusting the cutter in accordance therewith so that the thickness of the head and neck may be reduced a predetermined amount corresponding to the thickness of the body portion of the hide or skin. Conveniently, the cutter has associated therewith a gaging member mounted so that cutter and gaging member move together relatively to a gaged portion of the work before the cutter becomes operative to split off the excess thickness portions. In the illustrated machine, the cutter and gaging members are mounted upon a yielding cutter head which rotates about an axis to bring the gaging member in contact with the body portion of the hide or skin where it is backed by a work support, the construction and arrangement being such that the cutter head yields under the control of the gaging member thereby adjusting the cutter to the gaged thickness of the body portion of the hide or skin. Conveniently, the gaging member is constructed to serve also as a spreader member to spread out the hide or skin in front of the advancing cutter. While, as illustrated, both the cutter and the gage move together in their adjustment to the thickness of the work only the cutter is locked after adjustment since it is desirable that the gage which is also the spreader should be able to adjust itself to unusually thick portions of the work so as not to damage these portions by undue pressure. To increase the effectiveness of the illustrated cutter, it is given a movement in the direction of its length to effect a drawing cut on the work at the same time that it is moving bodily along through the work.

As illustrated, two cutter heads, each with a cutter and a gage, are provided, the construction and arrangement being such that in any given operation one cutter cheeks the hide or skin and the machine comes to rest with the other cutter in position to operate so that a cutter is always closely adjacent to a piece of work newly placed on the work support and thus in position to start cutting operations promptly, in this way increasing the speed of operation of the machine. As illustrated, the work support is so arranged that only the portions of the hide or skin to be reduced need to be introduced into the machine while the larger part of the hide or skin remains outside of the machine and by its weight serves to withdraw all of the hide or skin from the machine as soon as the reducing operation has been completed.

These and other features of the invention will be described in detail in the specification and pointed out more particularly in the appended claims.

In the drawings,

Fig. 2 is a detail view illustrating the operating means for one of the clamp lever arms;

Fig. 3 is a similar view showing also the relation of the cam for operating the clamp lever arm with respect to the cutter for operating on the work;

Fig. 4 is a view similar to Fig. 3 with the parts in a different position;

Fig. 5 is a sectional view of both upper and lower clamp members for the work;

Fig. 6 is a sectional view taken along the line VI—VI of Fig. 10;

Figs. 7 and 8 are views similar to Fig. 6 at different positions in the rotation of the cutters;

Fig. 9 is a view along the line IX—IX of Fig. 1;

Fig. 10 is a view in front elevation and partly in section of the machine shown in Fig. 1.

Fig. 11 is an enlarged detail view of the cutter and its immediate supporting means;

Figure 12:
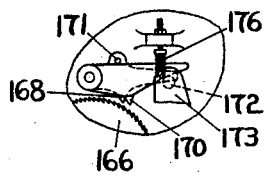
Fig. 12 is a detail of the locking pawls which hold the cutter head in adjusted position.

In the illustrated cheeking machine there is provided a work support 14 having a concave cylindrical surface 16 which supports a piece of work 18 during the operation of the cutters, as will be hereinafter described. In Fig. 5, the edge of the work support 14 over which the piece of work 18 is to be thrown is provided with a yielding clamping member 20, extending along the length of the support 14 and supported by a plurality of plungers 22 each adapted to be received in a closely fitting socket 24 in a socket member 25 formed as part of the work support 14, each plunger 22 being provided with a socket 26 adapted to receive a spring 28 constructed and arranged yieldingly to support its associated plunger 22 and the clamping member 20, as will be evident from an inspection of Figs. 5 and 10. In order to retain the clamping member 20 from displacement due to the tension of the springs 28 a plurality of screw threaded bolts are provided one for each socket 24, one of these bolts being shown at 30 in Fig. 5 as extending through the socket member 25 of the work support 14 and through the coiled spring 28 and screw threaded into its associated plunger 22, the adjustable nuts 31 of the bolt serving as a stop to limit the upward movement of the plunger 22 and thus of the clamping member 20. For adjusting the tension of the spring 28 a sleeve member 33 is screw threaded into the socket member 25 and surrounds the bolt 30 to press upwardly against the lower end of the spring 28.

Figure 13:
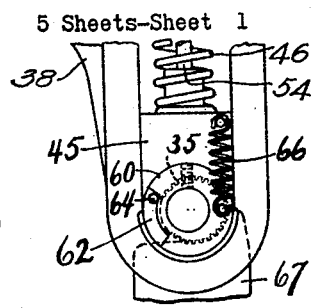
Fig. 13 is a detail view of another form of clamp for the work.
Figure 1:
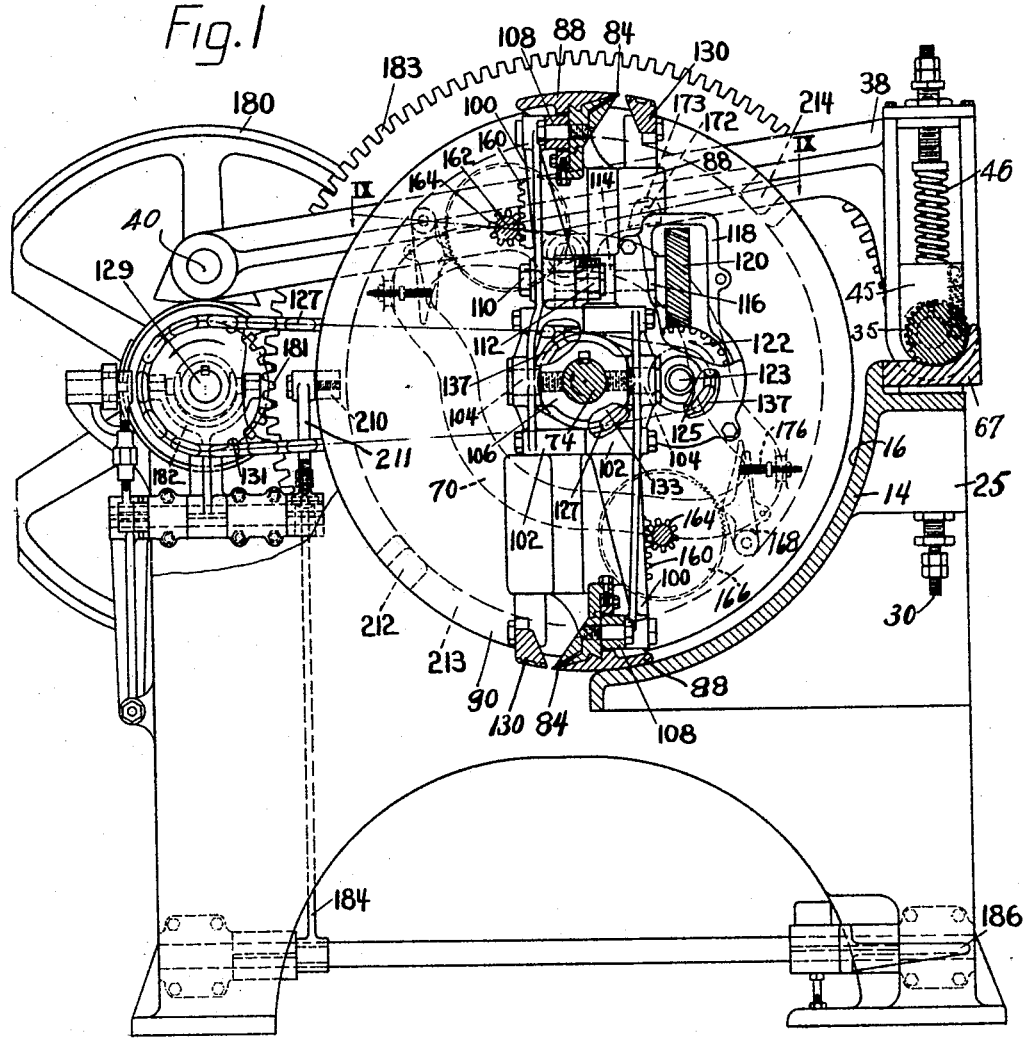
Fig. 1 is a sectional view of a machine illustrating one embodiment of the invention, the section being along the line I—I of Fig. 10 looking in the direction of the arrows.

For co-operation with the clamping member 20 which has a concave clamping surface 32, in duplicate, there is provided a cylindrical clamping member 34, in duplicate, having a convex fluted surface for co-operation with the concave surface 32 in securely gripping the work so that it may be retained against movement during the operation of the cutters. As shown in Figs. 2, 5 and 10, the clamping members 34 are fixedly mounted in the ends of two lever arms 38 pivoted at 40 on the frame of the machine and having enlarged end portions 42 (Fig. 5) each slotted to provide a guideway for a block 44 slidably mounted therein. For holding the block 44 at the lower end of its guideway there is provided a spring 46 which is under compression between a surface on the block 44 and a disk 48 at the end of a screw threaded sleeve 50, the latter being rotatable to adjust the disk 48 in directions toward and from the seat on the block 44 so as to vary the tension on the spring 46, a lock nut 52 being provided to hold the sleeve 50 in adjusted position. Extending through the sleeve 50 is a rod 54 having its ends screw threaded, one end for engagement with the block 44 and the other end for the reception of adjusting and lock nuts 56, the purpose of the rods 54 in the ends of the levers 38 being to adjust the blocks 44 and the clamping bars 34 with respect to the clamping member 20 having regard to the fact that the downward movement of the clamping bars 34 is controlled by the operating means for the levers 38 which give to the levers a downward movement of predetermined extent. In Figs. 1 and 13, another mounting of work clamping means is shown in which the clamping bar 35 may grip the piece of work the more firmly the greater the tension on the work becomes during cutting operations, the bar 35 being eccentrically mounted in the blocks 45 which are similar in many respects to blocks 44. At each end of the clamping bar 35 there is provided a disk 60 rigidly secured thereto and having a slotted portion at 62 into which projects a pin 64 fixed in the block 45, a spring 66 being provided for yieldingly holding the clamping bar 35 and the disk 60 with a shoulder at one end of the slot 62 in contact with the pin 64. It will be observed that the eccentric portion of the clamping bar 35 faces toward the front of the machine so that any tendency of the piece of work 18 to be drawn along with the cutters would be restrained by a slight turning movement of the clamping bar having the effect of gripping the work even more securely against a lower clamp member 67 similar to member 20 but having only one curved clamp surface instead of the two at 32 in member 20. For operating the clamping bar levers 38 cam slots 70 (Figs. 2, 3 and 4) are provided in disk members 72 rigidly secured to shaft 74, a roller 76 being carried by a pin 78 secured to the lever 38, the shape of the cam slot 70 being such that for each half revolution of disks 72 the levers 38 will be moved to closing position and subsequently to open position to release the work from the clamping bar 34 and its co-operating clamping member 20.

For splitting off from the thick portions of the head and neck of hides and skins sufficient substance to reduce the head and neck portions to the thickness of the body portion of the hide or skin, there is provided in the illustrated machine a cutter 84 (Fig. 11) mounted in a cutter bar 86 guided for reciprocation in a cutter head 88 which is yieldingly mounted for sliding movement within a frame consisting of two side members 90 (Fig. 10). Reciprocation of the cutter, it may be stated, is in the direction of its length and in a direction transverse of the bodily movement of the cutter over and through the work, to produce an effective drawing cut. For securing the cutter 84 to its bar 86 there is provided a clamp member 92 which is substantially of the same length as the cutter and has a slanting clamp surface 94 for engaging with the cutter 84 to clamp it against the bar 86, screw threaded members, one of which is shown at 96 (Fig. 11) being employed for the purpose of drawing the clamp member 92 tightly against the cutter. Preferably, and as shown, the cutter 84 may be adjusted by means of set screws 98, the adjustment taking place after such manipulation of the members 96 as will permit the block 92 to release the cutter. For holding the cutter bar 86 to the cutter head 88 there is provided a clamp and guide member 89 as most clearly shown in Fig. 11. In order that a cutter may be in position to operate promptly upon the work very shortly after the machine starts an operation there are preferably provided two cutters 84 with their corresponding cutter bars 86 and cutter heads 88 both mounted within the side frame members 90 at opposite points therein. Hence, the description of one cutter 84, with its supporting and operating means, will be found equally applicable to the other cutter. For reciprocating the cutters 84 there is provided a lever 100 (Figs. 1 and 10) having a central hub portion 102 pivotally mounted on stud 104 upon a sleeve 106, part of a housing hereinafter described, which rotates with the shaft 74, the ends of the lever 100 being connected by links 108 each to a cutter bar 86. Pivoted at 110 to the link 100 is a pitman 112 operating from an eccentric 114 on a stub shaft 116 carried by brackets 118 mounted on and movable with the shaft 74. Secured to the shaft 116 is a spiral gear 120 which is constantly in mesh with a spiral gear 122 on a shaft 123 supported by bracket 118, the shaft 123 being arranged to be driven by a sprocket 125 secured thereto and driven from a sprocket 133 loosely mounted on shaft 74, a chain 137 extending between the two sprockets. For driving sprocket 133 there is provided a chain 127 which is driven from power shaft 129 through a sprocket 131 fixedly secured thereto. Through the eccentric 114 the lever 100 is rocked rapidly to cause reciprocation of both cutters 84, reciprocation of the cutters continuing while the machine is in operation. By thus reciprocating the cutters while they are being bodily moved along over portions of the work, a drawing cut is produced which is distinctly advantageous since it results in cleaner cutting of the work while at the same time minimizing the tendency to overstretch the work.

It is to be understood that the cutters 84, together with the cutter heads 88, are rotated bodily during rotation of the shaft 74 to which the side frames 90 are securely attached. Hence, when a piece of work is clamped on the work support 14 and the machine is started in operation, one of the cutters 84 is caused to move along a path at a predetermined distance from and concentrically with respect to the curved cylindrical surface 16 so as to cut off all portions of the work in excess of a predetermined thickness for which the cutter is set. In Figs. 3 and 7, the lower cutter 84 is shown severing a part 139 from the hide or skin 18 while in Figs. 4 and 8 the operation has just been completed. Preferably, and as shown, each cutter is automatically adjusted, being controlled by the work itself, as will be explained, so that the head and neck portions after being operated upon, will be reduced to a thickness corresponding closely to the thickness of the body portion of the hide or skin. Hence, when a hide or skin 18 is thrown over the clamp member 20 with the head and neck portion resting upon the curved surface 16, sufficient of the body portion of the hide or skin is also thrown over the bar 20 so that a portion of the hide or skin which represents substantially the thickness of the whole body of the skin is presented at the upper part of the curved surface 16 where it may be gaged by gaging means comprising a gage member 130. As illustrated, the gage member is operative to move its associated cutter 84 to a position of adjustment such that the cutter will cut off all portions of the head and neck of a given hide or skin which represent excess thickness over the thickness gaged by the gage member 130. It is to be understood that each cutter has associated with it a gage member 130 so that the description of one will apply equally to the other. Referring particularly to Figs. 1, 6 and 10, it will be observed that the gage member 130 is mounted in the cutter head 88 and that the cutter head is slidably mounted within the side frames 90, being held yieldingly in initial outward position by means of springs 132. For reasons hereinafter stated, the gage member 130 is yieldingly mounted in the cutter head 88, the gage member 130 having a plurality of posts 134 rigid with the member 130 and projecting down into closely fitting sockets 135 (Fig. 6) within the cutter head 88, the lower end of each post 134 being bored to receive a spring 136 which tends to keep the gage member pressed outwardly to a position determined by the screw threaded member 138 with its set nuts 139 (Fig. 10). Through proper manipulation of the nuts 139, the gage may be adjusted with respect to the cutter head and cutter. In this way the plane of the cut may be varied with respect to the gaged thickness of the work. In other words the plane of the cut does not necessarily have to be in the plane of that surface of the work selected for gaging purposes. By reason of this capability of adjustment, the thickness of the head and neck portions of a hide or skin, after a cheeking operation, may be greater than the thickness of that portion of the hide selected for gaging purposes. However, the cutter is controlled by the gage and is automatically set with respect to the parts to be cut as each piece of work in turn is operated upon.

Since the springs 136 are considerably stronger than the springs 132 the latter will yield when the gage member 130 engages with a piece of work backed by the curved cylindrical work supporting surface 16, thus permitting inward movement (that is, movement toward the shaft 74) of the gage 130 and of cutter head 88 together with the cutter 84 carried thereby. This gaging of the work and consequent adjustment of the cutter 84 takes place when the gage member 130 engages with that portion of the hide or skin which is located upon the upper part of the cylindrical work supporting surface 16 where the body portion of the hide, next to the thickened neck portion, has been introduced to serve as a control for the gage, since it is to this thickness that it is desired to reduce the unusually thick neck and head portions of the hide or skin. Upon reference to Fig. 6, it will be observed that each cutter head 88 is retained within the frame members 90 by means of rods 150, one at each end of the head, which pass through the sockets containing the springs 132, the said rods being provided with adjusting and locking nuts 152 so that each cutter head 88 may be adjusted with respect to the curved work supporting surface 16. Furthermore, surrounding each rod 150 is a sleeve 154 having at its inner end a disk 156 for contact with the spring 132, the arrangement being such that the sleeve 154 may be rotated to adjust the disk and thus vary the tension of the spring 132. Upon inspection of Fig. 6, it will be observed that the springs 132 for each cutter block are located near one edge of the cutter block and not along a longitudinal median line of the block. The reason for this resides in the fact that the gage member 130, which contacts with the work first and with a very considerable pressure, is located not along a longitudinal median line of the cutter head but closely adjacent one side of the cutter head. Hence, the springs 132 are so located as to take this thrust in substantially the plane of the gage member 130.

After an adjusting movement of the cutter head 88 in accordance with the position of the gage member 130 has taken place, a locking means becomes operative to lock the cutter head with its cutter in adjusted position so that during the cutting operations the cutter may be maintained at the gaged distance from the work supporting surface 16. In the construction shown, the locking means referred to comprises a plurality of rack bars 160 (Fig. 6) integral with the cutter head 88 adjacent to each end thereof, it being obvious, however, that the rack bar may be a separate element fixedly secured to the cutter head. For co-operation with the rack bars 160 there is provided a shaft 162 having a pinion 164 adjacent each end thereof arranged in mesh with the teeth of the associated rack bar. Upon movement of the cutter head 88 within its guides in the side frames 90, due to pressure on the gage 130, the shaft 162 will be rotated and in its rotation a ratchet wheel 166, fixedly secured to the shaft 162, will also be rotated to present its toothed periphery in adjusted relation with respect to locking pawls 168, 170, two pawls being provided to secure finer adjustment than is possible with one pawl. Upon rotation of the frame comprising side pieces 90, each cutter head in turn is caused to approach the work supporting surface 16 and during this approaching movement the pawls 168, 170 are moved to unlocking position with respect to the ratchet wheel 166 so that the gaging bar 130 may move the cutter head 88 to a position determined by the thickness of the work resting against the upper portion of the work supporting surface 16. For thus operating the pawls there is provided a pin 172 which contacts with pawl 170 while pawl 168 is operated from pawl 170 by the latter contacting with a pin 171 extending sidewise from pawl 168. The pin 172 is stationary in space, being supported in fixed position by a member 173 carried by a part of the machine frame. Through contact with the pin 172 the pawls are turned about their pivotal axes and against the tension of springs 174, 176 to release the ratchet wheel 166 which is thus momentarily unlocked to permit the gage to adjust the cutter head 88, continued movement of the cutter head in the same direction along the surface 16 being followed by release of the pawls as they pass by the pin 172 whereupon they move into contact with the ratchet wheel 166 and thereby lock the cutter head in its adjusted position.

Preferably, and as shown, a work spreading means is provided for spreading out the piece of work in advance of the operation of the cutter. Conveniently, the gage member 130 is constructed to serve also as a spreading means by providing the gaging surface with a plurality of ribs 180, slanting in opposite directions from a median point in the length of the gage member, as most clearly shown in Fig. 10 of the drawings. Since this combined gage and spreader member 130 moves along over the work in advance of its associated cutter 84 it follows that it should be mounted in the cutter head 88 to yield after the latter is locked to accommodate itself to any considerable variations in the thickness of the work, otherwise it might injure the work by too great pressure, especially at the thicker portions thereof. It is for this reason that the member 130 is backed by yielding springs 136.

Power is furnished for causing rotation of the cutter heads and reciprocation of the cutters through a pulley 180 adapted to receive a belt (not shown) driven from any suitable source of power. As shown, this pulley 180 is fast upon the shaft 129 (Fig. 1) which carries a pinion 181 adapted to be clutched thereto by movement of the yoke member 182 (Figs. 1 and 10). Arranged in mesh with pinion 181 is a large gear 183 secured to shaft 74, so that the latter is driven whenever pinion 181 is clutched to shaft 129 by clutch means (not shown). At the same time that the clutch is thrown in through link connection 184 leading to the treadle 186, a latch member 210 at the upper end of lever arm 211 is withdrawn from a socket 212 or 214, whichever socket it happens to be resting in at the time, the sockets 212, 214 being provided in one of the frame members 90 which are rigidly secured to the shaft 74. As soon as the machine starts in operation the operator releases the treadle, so that during the rotation of the shaft 74 and the frame members 90, the end of the latch member 210 rides along upon the peripheral portion 213 of the adjacent member 90 thus keeping the clutch engaged until the other socket comes along at the end of a half rotation whereupon the latch member 210 drops into the socket, thereby disconnecting the clutch and at the same time locking the cutter carrying members 90 against further rotation. It will be readily understood then that the cutter heads secured within the frame members 90 make a half revolution about the axis of the shaft 74 and then come to rest with one of the cutters 84 positioned as closely adjacent to the clamping bar 20 as possible while, at the same time providing a space sufficient between the cutter and the clamping bar to permit ready introduction of the work. When the machine is started in operation the cutter, in the position shown in Fig. 1 above the clamping bar 20, immediately descends and operates upon the work while during its operation the other cutter moves around toward the initial position of rest of the first cutter.

In operating the illustrated machine, a hide or skin is introduced by having its head and neck portions thrown over the clamping bar 20 so that they may rest upon the concave cylindrical surface 16. As already stated in the foregoing specification, all of the head and neck portions should thus be introduced and also enough of the body portion of the hide or skin so that the gage member 130 may contact therewith to obtain the thickness dimension to which it is desired to reduce the normally thicker and heavier neck and head portions. Upon depressing the treadle 186 the clutch is thrown in to cause rotation of the shaft 74 whereupon the cutter heads are revolved to bring the adjacent cutter head 86 with its associated gage member 130 into contact with the work resting upon the upper part of the work supporting surface 16. At the instant the gage member 130 reaches the work the cutter head 88 is unlocked momentarily so that the gage bar through its contact with the work may shove the cutter head away from the surface 16 in the gaging operation. In thus moving the gage and the cutter head, the cutter 84 is adjusted to a position determined by the thickness of the work at the time in gaging position on the surface 16. As the cutter head continues in motion in the same direction the pawls 168, 170 are permitted to re-engage with the ratchet wheel 166, thereby locking the cutter head with its cutter 84 in adjusted position so that in its operation the head and neck portions of the hide or skin will be reduced to the thickness of the work with which the gage member 130 contacted during its gaging operation. During rotation of the cutter heads, the cutters are reciprocated to increase their cutting efficiency. Upon completing one-half of a revolution about the axis of the shaft 74, the cutter heads come to rest with the other cutter in position above and to the right of the clamp bar 20, as shown in Fig. 6 of the drawings. Just as the cutter head is coming to rest the clamping bar 34 or 35 is lifted to release the hide or skin. When this occurs the cheeked neck and head portions of the hide or skin are immediately withdrawn without any effort on the part of the operator, since the weight of the larger and heavier portion of the hide or skin outside of the machine operates to withdraw the head and neck portions away from the supporting surface 16. The machine is then ready for the introduction of a fresh piece of work.

Having described our invention, what we claim as new and desire to secure by Letters Patent of the United States is:

1. In a machine for splitting off portions from the heads and necks of hides and skins, a support for backing a piece of work, a cutter for operating on the work mounted for movement toward and from the support, and means, connected to the movable cutter, for engaging a portion of the work where it is backed by the support and operative to cause relative adjustment of the cutter and the work support before the operation of the cutter on the work.

2. In a machine for splitting off portions from the heads and necks of hides and skins, a support for backing a piece of work, a cutter mounted for movement toward the work support, and a gage member mounted to move with the movable cutter to engage a portion of the work where it is backed by the support and operative to cause relative adjustment of the work support and the cutter in accordance with the thickness of the work.

3. In a machine for splitting off portions from the heads and necks of hides and skins, a support for backing a piece of work, a cutter for operating on the work, a cutter head for carrying the cutter, means for yieldingly moving the cutter head toward the work, and a gage member, carried by the cutter head, for engaging a portion of the work where it is backed by the support and adjusting the movable cutter in accordance with the thickness of the work.

4. In a machine for splitting off portions from the heads and necks of hides and skins, a support for backing a piece of work, a cutter for operating on the work, said cutter being movably mounted, means for engaging a portion of the work where it is backed by the support and adjusting the movable cutter in accordance with the thickness of the work, and means for subsequently locking the cutter in its adjusted position.

5. In a machine for splitting hides, skins, leather, and other similar pieces of work, a support for backing a piece of work, a cutter for operating on the work, a cutter head in which the cutter is mounted, said cutter head being mounted for movement toward and from the work, a gage member carried by the cutter head for engaging a portion of the work where it is backed by the support and operative to adjust the movable cutter head and the cutter supported thereby relatively to the work, and means for subsequently locking the cutter head in its adjusted position.

6. In a machine for splitting hides, skins, leather, and other similar pieces of work, a support for a piece of work, a cutter for operating on the work, a cutter head in which the cutter is mounted, said cutter head being mounted for movement toward and from the work, means for yieldingly pressing the cutter head toward the work, a gage member mounted on the cutter head for engaging a portion of the work and operative to adjust the cutter head in accordance with the thickness of the work, means for locking the cutter head in adjusted position, and means for yieldingly backing the gage member so that it may yield relatively to the cutter head after the latter has been locked in adjusted position.

7. In a machine for splitting hides, skins, leather, and other similar pieces of work, a support for backing a piece of work, a cutter for operating on the work, said cutter being mounted for movement toward and from the work, and a member, movable with the cutter, for engaging a portion of the work where it is backed by the support for adjusting the movable cutter relatively to the work, said member serving also as a spreading means to spread out the work prior to the operation of the cutter.

8. In a machine for splitting hides, skins, leather, and other similar pieces of work, a support for backing a piece of work, a cutter for operating on the work, and a gage member for engaging a portion of the work where it is backed by the support for adjusting the cutter relatively to the work, said gage member having ribs on its surface extending in opposite directions from the transverse median line of the member for causing spreading of the work prior to the operation of the cutter.

9. In a cheeking machine, a support for backing a hide or skin to be cheeked, a clamp for temporarily securing the hide or skin to the support, a cutter for splitting off a portion from the head and neck portions of the hide or skin, said cutter being movable toward and from the work support before operation on the work begins, and a member for engaging the body portion of the hide or skin where it is backed by the support and operative as a gage to set the movable cutter to the thickness of the hide or skin where it is engaged by the said member.

10. In a cheeking machine, a support for backing a hide or skin to be cheeked, a clamp for temporarily securing the hide or skin to the support, a cutter for splitting off a portion from the head and neck portions of the hide or skin, said cutter being movable toward and from the work support before operation on the work begins, and a member for engaging the body portion of the hide or skin where it is backed by the support and operative as a gage to set the movable cutter to the thickness of the hide or skin where it is engaged by the said member, and means for subsequently locking the cutter in its set or adjusted position.

11. In a cheeking machine, a support for backing a hide or skin to be cheeked, a clamp for temporarily securing the hide or skin to the support, a cutter bodily movable along over the work support for splitting off a portion from the head and neck portions of the hide or skin, said cutter being movable toward and from the work support before operation on the work begins, and a member for engaging the body portion of the hide or skin where it is backed by the support and operative as a gage to set the movable cutter to the thickness of the hide or skin where it is engaged by the said member.

12. In a machine for evening hides or skins, a support for a hide or skin, a cutter, a cutter head in which the cutter is mounted, and a gage member mounted upon the cutter head for engaging a portion of the work to adjust the cutter with respect to the work prior to its operation on the work, said cutter head being mounted to yield under pressure of the gage member.

13. In a machine for splitting hides, skins, leather, and other similar pieces of work, a support for a hide or skin to be split, a movable cutter, a gage member associated with the cutter and automatically operative to adjust the cutter with respect to the work prior to its operation on the work, and means for locking the cutter in its adjusted position prior to its operation on the work.

14. In a machine for splitting hides, skins, leather, and other similar pieces of work, a support for a hide or skin to be split, a cutter mounted for movement toward a hide or skin on the support, and means for gaging the thickness of the body portion of the hide or skin and for automatically adjusting the cutter in accordance therewith.

15. In a machine for splitting hides, skins, leather, and other similar pieces of work, a support for a hide or skin to be split, a cutter mounted for movement toward a hide or skin on the support, and a gaging member movable with the cutter relatively to a gaging portion of the work before the cutter becomes operative to split off a piece from the thickened head and neck portions of the hides and skins.

16. In a machine for splitting hides, skins, leather, and other similar pieces of work, a support for a hide or skin to be split, a cutter, a cutter head in which the cutter is mounted, means for yieldingly pressing the cutter head toward the work, and means associated with the movable cutter head for adjusting the latter with respect to the hide or skin to predetermine the thickness to which the hide or skin will be reduced after the splitting operation.

17. In a machine for splitting hides, skins, leather, and other similar pieces of work, a support for a hide or skin to be evened in thickness, a cutter movable toward and away from a hide or skin on the support, a cutter head in which the cutter is mounted, means for yieldingly pressing the cutter head toward the work, and means controlled by engagement with the hide or skin for adjusting the cutter with respect thereto to predetermine the thickness to which the hide or skin will be reduced after the evening operation.

18. In a machine for splitting hides, skins, leather, and other similar pieces of work, a support for a hide or skin to be evened in thickness, a cutter mounted so as to be movable bodily along over the work support at a predetermined distance therefrom to cut off portions of excess thickness from the hide or skin, a cutter head for supporting the cutter yieldably with respect to the hide or skin, and gage means mounted on the cutter head for controlling it to cause the cutter to be adjusted to the thickness of a selected portion of the work.

19. In a cheeking machine, a support for a hide or skin to be cheeked, means for temporarily securing the hide or skin to the support, a cutter movable bodily along over the work support at a predetermined distance therefrom to cut off excess portions from the hide or skin, and means for moving the cutter in the direction of its length during its bodily movement with respect to the work so as to effect a drawing cut upon the work.

20. In a cheeking machine, a support for a hide or skin to be cheeked, means for temporarily securing the hide or skin to the support, a cutter movable bodily along over the work support at a predetermined distance therefrom to cut off excess portions from the hide or skin, and power means for reciprocating the cutter during its bodily movement over the work support so as to effect a drawing cut upon the work.

21. In a cheeking machine, a support for a hide or skin to be cheeked, means for clamping a hide or skin temporarily to the work support, a cutter for operating on hides and skins to split off portions of excess thickness, a cutter head for supporting the cutter, a gage associated with the cutter in the cutter head for adjusting the cutter head and cutter with respect to the work prior to a cutting operation thereon, and means for mounting the gage yieldingly in the cutter head 22. In a cheeking machine, a support for a hide or skin to be cheeked, means for clamping a hide or skin temporarily to the work support, a cutter for operating on hides and skins to split off portions of excess thickness, a cutter head for supporting the cutter, a combined gage and spreader for the work mounted in the cutter head for adjusting the latter with respect to the work prior to a cutting operation, and means for mounting the combined gage and spreader yieldingly in the cutter head.

23. In a cheeking machine, a support for a hide or skin to be cheeked, said support having a concave work supporting surface, a cutter for operating upon the hide or skin, means for bodily moving the cutter along a path concentric with respect to the concave surface of the work support, and means for moving the cutter in a direction transverse to its bodily movement so as to effect a drawing cut upon the work during its bodily movement with respect to the work.

24. In a cheeking machine, a support for a hide or skin to be cheeked, said support having a concave work supporting surface, a cutter for operating upon hides and skins, a cutter head for supporting the cutter, means for moving the cutter head along a path concentric with respect to the concave surface of the work support thereby causing the cutter to pass along over the work supporting surface at a predetermined distance therefrom, and means associated with the cutter head to adjust the cutter to the thickness of the body portion of the hide or skin being operated upon.

25. In a cheeking machine, a support having a supporting surface for a hide or skin to be cheeked, a cutter for operating upon hides and skins, a cutter head for supporting a cutter, a supporting frame in which the cutter head is slidably mounted, means for rotating the frame, thereby causing the cutter to pass over the work supporting surface, and a gage member associated with the cutter head and controlled by the work for causing relative adjustment of the cutter and the work support prior to the operation of the cutter on the work.

26. In a machine for reducing the thickness of portions of hides, skins, leather, and other similar pieces of work, a stationary support having a supporting surface for a piece of work, means for temporarily securing the work to the support with a portion thereof resting on said surface, a cutter for operating on the work, a cutter head in which the cutter is mounted, a member carried by the cutter head for engaging the work adjacent to the securing means and operative to adjust the cutter relatively to the work, and means for operating the cutter to split off certain portions of the work.

27. In a machine for reducing the thickness of portions of hides, skins, leather, and other similar pieces of work, a stationary support having a supporting surface for a piece of work, means for temporarily securing the work to the support with a portion thereof resting on said surface, a cutter, means for moving the cutter bodily along over the work supporting surface, and means for moving the cutter transversely to the direction of its bodily movement to cut off portions of the work thus to reduce the thickness of certain parts of the piece of work.

28. In a cheeking machine, a support having a concave cylindrical supporting surface for a hide or skin to be cheeked, a clamp for temporarily securing the hide or skin to the support, a cutter constructed and arranged to split off a portion from the head and neck portions of the hide or skin, a cutter head for supporting the cutter, means for imparting a draw-cut movement to the cutter, and means for moving the cutter head and cutter about an axis at the center of the cylindrical work supporting surface whereby the cutter is caused to move along a path concentric with respect to the concave work supporting surface to operate upon the work backed by the said surface.

29. In a cheeking machine, a stationary support having a concave cylindrical supporting surface for backing a hide or skin to be cheeked, a clamp for temporarily securing the hide or skin to the support, a cutter for splitting off a portion from the head and neck portions of the hide or skin, a member for engaging the body portion of the hide or skin where it is backed by the support and operative as a gage to set the cutter to the thickness of the hide or skin where it is engaged by the said member, and means for operating the cutter over the work supporting surface to reduce the thickness of the head and neck portions of the hide or skin.

30. In a cheeking machine, a stationary support for a hide or skin to be cheeked having a concave cylindrical work supporting surface of a length and width to support the head and neck portions of a hide or skin in extended condition, means for clamping a hide or skin temporarily to the work support with the head and neck portions thereof resting on the support, a cutter of a length to extend completely across the head and neck portions of a hide or skin for operating thereon to split off portions of excess thickness, a frame for supporting the cutter, said frame being mounted to turn on an axis at the center of the cylindrical work supporting surface, and means for rotating the frame through a predetermined angular distance at each cycle of the machine to cause the cutter to complete a cheeking operation upon a hide or skin in position on the work support.

31. In a checking machine, a stationary support for a hide or skin to be cheeked having a concave cylindrical work supporting surface, means for clamping a hide or skin temporarily to the work support with the head and neck portions thereof resting on the support, a plurality of cutters, each operative to split off portions from a piece of work, a frame for supporting the cutters, said frame being mounted to turn on an axis at the center of the cylindrical work supporting surface, and means for rotating the frame a predetermined amount to cause a given cutter to operate upon a hide or skin in position on the work support, means being provided for bringing the frame to a stop after the operation of the cutter so that a fresh piece of work may be introduced for treatment by another cutter.

32. In a cheeking machine, a support for a hide or skin to be cheeked, a plurality of cutters for operating on hides and skins to split off portions of excess thickness, a frame for supporting the cutters, and means for rotating the frame a predetermined amount to cause one of the cutters to operate upon a hide or skin in position on the work support, said means comprising a stop for holding the frame in a position of rest with one of the cutters spaced a relatively short distance from the work when it is upon the support.

33. In a cheeking machine, a support for a hide or skin to be cheeked having a concave cylindrical work supporting surface, means for clamping a hide or skin temporarily to the work support, two cutters for operating on hides and skins to split off portions of excess thickness, a frame for supporting the cutters, said frame being mounted to turn on an axis at the center of the cylindrical work supporting surface, means for rotating the frame to cause each of the cutters in turn to operate upon a hide or skin in position on the work support, and means for imparting a drawing-cut movement to the cutter operating on the work during movement of the cutter along with the frame.

34. In a cheeking machine, a support for a hide or skin to be cheeked having a concave cylindrical work supporting surface, means for clamping a hide or skin temporarily to the work support, two cutters for operating on hides and skins to split off portions of excess thickness, a frame for supporting the cutters, said frame being mounted to turn on an axis at the center of the cylindrical work supporting surface, and means for rotating the frame a predetermined amount at each cycle of the machine to cause each of the cutters in turn to operate upon a hide or skin in position on the work support, said means comprising a stop for holding the frame in a position of rest with one of the cutters spaced a relatively short distance from the work when it is clamped upon the support.

35. In a cheeking machine, a support for a hide or skin to be cheeked, a plurality of cutters for operating upon pieces of work placed upon the support, and means controlled by the work for adjusting the cutters to the thickness of the work so that portions of excessive thickness may be reduced during the operation of the cutters.

36. In a cheeking machine, a support for a hide or skin to be cheeked, a plurality of cutters for operating upon pieces of work on the support, a plurality of cutter heads in each of which a cutter is mounted, means for moving the cutter heads with their associated cutters in succession toward the work, and means associated with the cutter heads and operated by contact with the work for adjusting the cutters with respect to the work.

37. In a cheeking machine, a support for a hide or skin to be cheeked, a plurality of cutters for operating upon pieces of work clamped upon the support, a plurality of cutter heads in each of which a cutter is mounted, means for yieldingly pressing the cutter heads toward the work, and means associated with the cutter heads for automatically adjusting the latter to predetermine the thickness to which the hide or skin will be reduced after the cheeking operation.

38. In a cheeking machine, a support for a hide or skin to be cheeked, means for temporarily securing the hide or skin to the support, a plurality of cutters for operating upon a hide or skin, means for moving the cutters bodily along the support at a predetermined distance therefrom, and interconnected means for reciprocating the cutters during their bodily movement.

39. In a cheeking machine, a support for a hide or skin to be cheeked, a clamp for temporarily securing the hide or skin to the support, a plurality of cutters for operating upon pieces of work clamped upon the support, and a gage member associated with each cutter for adjusting the cutter in accordance with the thickness of the work prior to its operation on the work.

40. In a cheeking machine, a support for a hide or skin to be cheeked, a clamp for temporarily securing the hide or skin to the support, a cutter for operating upon pieces of work clamped upon the support, and a gage member associated with the cutter for adjusting the latter in accordance with the thickness of the work prior to its operation on the work.

41. In a cheeking machine, a support for a hide or skin to be cheeked, a clamp for temporarily securing the hide or skin to the support, a plurality of cutters for operating upon pieces of work clamped upon the support, a gage member associated with each cutter for adjusting the cutter with respect to the work prior to its operation on the work, and means for locking each cutter in its adjusted position prior to its operation on the work.

42. In a cheeking machine, a support having a supporting surface for a hide or skin to be cheeked, a cutter for operating upon hides and skins, a cutter block for carrying the cutter, a frame for slidably supporting the cutter block, means for rotating the frame about an axis parallel to the work supporting surface, a gage member controlled by the work for adjusting the cutter with respect to the work, and means for reciprocating the cutter during its bodily movement along over the surface of the work support.

43. In a cheeking machine, a support for a hide or skin to be cheeked having a concave cylindrical supporting surface for the work, means for temporarily clamping the hide or skin upon the work support, a cutter for operating the hide or skin, means for rotating the cutter about an axis at the center of the cylindrical supporting surface, and means for moving the cutter in a direction transverse to its bodily movement so as to effect a drawing cut upon the work during its bodily movement with respect to the work.

44. In a cheeking machine, a support having a supporting surface for a hide or skin to be cheeked, a plurality of cutters for operating upon hides and skins, a plurality of cutter heads each slidably supporting a cutter, a supporting frame in which the cutter heads are mounted, means for rotating the frame, thereby causing each cutter in turn to pass along over the work supporting surface, and means for reciprocating each cutter in its supporting head while it is passing over the work supporting surface.

45. In a cheeking machine, a support having a supporting surface for a hide or skin to be cheeked, a plurality of cutters for operating upon hides and skins, a plurality of cutter blocks each slidably carrying a cutter, a frame for slidably supporting the cutter blocks, means for rotating the frame about an axis parallel to the work supporting surface, a gage member associated with each cutter block for adjusting the cutter with respect to the work, and means for moving the cutters in a direction parallel to the axis of rotation of the frame during rotation of the frame to effect a drawing cut upon the work during bodily movement of the cutter over the work supporting surface.

46. In a cheeking machine, a support having a supporting surface for a hide or skin to be cheeked, a plurality of cutters for operating on hides and skins to split off excess portions thereof, a cylindrical frame for supporting the cutters, said frame being mounted to turn on an axis parallel to the work supporting surface, and means for rotating the frame a predetermined amount at each cycle of the machine to cause one of the cutters to operate upon a hide or skin in position on the work support, said means comprising a stop for holding the frame in a position of rest with one of the cutters spaced a relatively short distance from a piece of work upon the support.

47. In a cheeking machine, a support for a hide or skin to be cheeked having a concave cylindrical supporting surface for the work, means for temporarily clamping the hide or skin upon the work support, a plurality of cutters for operating upon hides and skins, a plurality of cutter heads each supporting a cutter, a supporting frame in which the cutter heads are slidably mounted, means for rotating the frame, thereby causing each cutter in turn to pass over the work supporting surface, and a gage member associated with each cutter head for adjusting its associated cutter with respect to the work.

48. In a cheeking machine, a support for a hide or skin to be cheeked, having a concave cylindrical supporting surface for the work, means for temporarily clamping the hide or skin upon the work support, a plurality of cutters for operating upon hides and skins, a plurality of cutter blocks each carrying the cutter, a frame for slidably supporting the cutter blocks, means for rotating the frame about an axis at the center of the cylindrical work supporting surface, a member associated with each cutter for adjusting the cutter with respect to the work, and means for reciprocating the cutters during their bodily movement along over the surface of the work support.

49. In a cheeking machine, a support for a hide or skin to be cheeked, having a concave cylindrical supporting surface for the work, means for temporarily clamping the hide or skin upon the work support, a plurality of cutters for operating upon hides and skins, a plurality of cutter blocks each carrying the cutter, a frame for slidably supporting the cutter blocks, means for rotating the frame about an axis at the center of the cylindrical work supporting surface, a member associated with each cutter for adjusting the cutter with respect to the work, and means for moving the cutters in directions parallel to the axis of rotation of the frames during rotation of the frames to carry the cutters past the work support.

50. In a cheeking machine, a support for a hide or skin to be cheeked having a concave cylindrical work supporting surface, means for clamping a hide or skin temporarily to the work support, a plurality of cutters for operating on hides and skins to split off excess portions thereof, a cylindrical frame for supporting the cutters, said frame being mounted to turn on an axis at the center of the cylindrical work supporting surface, means for rotating the frame to cause one of the cutters to operate upon a hide or skin in position on the work support, means for causing simultaneously with the rotation of the frame reciprocation of the cutters so that the latter operate upon the work with a drawing cut, and means for adjusting each cutter in turn at a predetermined distance from the curved work supporting surface prior to its operation upon the work.

51. In a cheeking machine, a support for a hide or skin to be cheeked having a concave cylindrical work supporting surface, means for clamping a hide or skin temporarily to the work support, a plurality of cutters for operating on hides and skins to split off excess portions thereof, a cylindrical frame for supporting the cutters, said frame being mounted to turn on an axis at the center of the cylindrical work supporting surface, means for rotating the frame to cause one of the cutters to operate upon a hide or skin in position on the work support, means for causing simultaneously with the rotation of the frame reciprocation of the cutters so that the latter operate upon the work with a drawing cut, and a gage associated with each cutter for adjusting it with respect to the work prior to its operation thereon.

52. In a cheeking machine, a support for a hide or skin to be cheeked having a concave cylindrical work supporting surface, means for clamping a hide or skin temporarily to the work support, a plurality of cutters for operating on hides and skins to split off excess portions thereof, a cylindrical frame for supporting the cutters, said frame being mounted to turn on an axis at the center of the cylindrical work supporting surface, means for rotating the frame to cause one of the cutters to operate upon a hide or skin in position on the work support, means for causing simultaneously with the rotation of the frame reciprocation of the cutters so that the latter operate upon the work with a drawing cut, and gage members for engaging with a body portion of a hide or skin to set the cutters at the thickness thereof at the gaged point prior to the operation of the cutters on the work.

53. In a cheeking machine, a support for a hide or skin to be cheeked having a concave cylindrical work supporting surface, means for clamping a hide or skin temporarily to the work support, a plurality of cutters for operating on hides and skins to split off excess portions thereof, a cylindrical frame for supporting the cutters, said frame being mounted to turn on an axis at the center of the cylindrical work supporting surface, means for rotating the frame to cause one of the cutters to operate upon a hide or skin in position on the work support, means for causing simultaneously with the rotation of the frame reciprocation of the cutters so that the latter operate upon the work with a drawing cut, a gage member for engaging with a body portion of a hide or skin to set each cutter at the thickness of the work at the gaged point prior to its operation on the work, and means for locking the cutter in its adjusted position prior to its operation on the work.

54. In a machine for operating on hides, skins, leather, and other similar pieces of work, a support having a supporting surface for a piece of work, a cutter for operating on the piece of work, a rotary clamping member, arms for carrying the clamping member toward the support for holding the work temporarily secured against a portion of the work supporting surface, said clamping member being eccentrically mounted so as to rotate and thereby clamp the work more firmly, and means for automatically returning the clamping member always to the same initial position in its supporting arms following a clamping operation.

55. In a machine for operating on hides, skins, leather, and other similar pieces of work, a support having a supporting surface for a piece of work, a cutter for operating on the work, a cylindrical member for clamping the work upon a portion of the work supporting surface, said cylindrical clamping member being eccentrically mounted, and means for movably holding the clamping member in a predetermined initial clamping position, said means being constructed and arranged to permit the clamping member to be rotated by the work to clamp the work more firmly as the strain thereon is increased.

56. In a machine for operating on hides, skins, leather, and other similar pieces of work, a support having a supporting surface for a piece of work, a cutter for operating on the work, a member for clamping a piece of work upon a portion of the work supporting surface, a stop for locating the clamping member in an initial work clamping position, and a spring for holding the clamping member yieldingly against the stop, said clamping member being rotatably mounted to bring successive portions of its surface to bear upon the work to clamp the work more firmly as the strain on the work is increased.

57. In a machine for operating on hides, skins, leather, and other similar pieces of work, a support having a supporting surface for a piece of work, a cutter for operating on the work, a member for clamping the work upon a portion of the work supporting surface, said clamping member being eccentrically mounted for rotary movement, a stop, and a spring for holding the clamping member against the stop in an initial work clamping position, the spring being adapted to yield to permit the clamping member to rotate to clamp the work more firmly as the strain thereon is increased.

58. In a machine for operating on hides, skins, leather, and other similar pieces of work, a support having a supporting surface for a piece of work, said support having further a yieldingly mounted clamping member, a member movable toward the work support and having a member for clamping the work in co-operation with the first-mentioned clamping member, the second-mentioned clamping member being eccentrically mounted for rotary movement, and means for holding the second-mentioned clamping member in a predetermined initial clamping position, the construction and arrangement being such that the eccentrically mounted clamping member may be rotated by the work to exert greater clamping pressure as the strain on the work increases.

59. In a machine for operating on hides, skins, leather, and other similar pieces of work, a support having a supporting surface for a piece of work, a cutter for operating on the work, a member movable toward and from the work supporting surface for clamping the piece of work on a portion of the work supporting surface, said clamping member being also rotatably mounted and having a fluted surface eccentrically arranged so that upon rotation of the clamping member it applies a constantly increasing pressure to the work as the strain on the latter increases, and means operative to rotate the clamping member automatically to its initial position following a clamping operation.

60. In a machine for splitting hides, skins, leather, and other similar pieces of work, a support for a hide or skin to be split, a cutter mounted for movement toward a hide or skin on the support, means for causing relative movement between the support and the cutter in a plane parallel to the work supporting surface of the work support whereby the cutter is caused to split a piece from the work, and a gaging member movable with the cutter relatively to a gaging portion of the work, to adjust the cutter with respect to the work, said gaging member being adjustable with respect to the cutter to vary the plane of the cut with respect to the surface of the work which serves as a gaging surface in co-operation with the gaging member.

61. In a machine for splitting hides, skins, leather and other similar pieces of work, a support for a hide or skin, a cutter movable toward and away from a hide or skin on the support, a cutter head in which the cutter is mounted, means for yieldingly pressing the cutter head toward the work, a gage carried by the cutter head and adapted for engagement with a selected gaging surface of the work to limit the movement of the cutter head and cutter toward the work under the action of the pressing means, and means for causing relative movement between the work support and cutter to effect a cutting operation on the work, said gage being adjustable in the cutter head and with respect to the cutter so as to predetermine the plane of the cut with respect to the gaging surface of the work.

In testimony whereof we have signed our names to this specification.

HARRIE A. BALLARD.
OLAF T. HOELSLOCK.